(12) United States Patent
Cun

(10) Patent No.: US 9,855,853 B2
(45) Date of Patent: Jan. 2, 2018

(54) SYSTEM AND METHOD FOR COOPERATIVELY OPERATING A SMART THERMOSTAT AND VEHICLE TO GRID AUTOMOBILE

(71) Applicant: Honda Motor Co., Ltd., Tokyo (JP)

(72) Inventor: David W Cun, Fountain Valley, CA (US)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 14/854,280

(22) Filed: Sep. 15, 2015

(65) Prior Publication Data

US 2017/0072810 A1    Mar. 16, 2017

(51) Int. Cl.
*B60L 11/18*    (2006.01)
*F24F 11/00*    (2006.01)

(52) U.S. Cl.
CPC ......... *B60L 11/1842* (2013.01); *B60L 11/184* (2013.01); *B60L 11/1861* (2013.01); *F24F 11/00* (2013.01)

(58) Field of Classification Search
CPC ................ B60L 11/1842; B60L 11/184; B60L 11/1861; B60H 1/00257; F24F 11/00
USPC ............................... 700/295–297; 701/36–37
See application file for complete search history.

(56) References Cited

U.S. PATENT DOCUMENTS

| | | | |
|---|---|---|---|
| 8,686,687 B2 | 4/2014 | Rossi | |
| 2007/0282495 A1 | 12/2007 | Kempton et al. | |
| 2009/0021221 A1 | 1/2009 | Krauer et al. | |
| 2009/0114463 A1* | 5/2009 | DeVault | B60K 6/365 |
| | | | 180/65.29 |
| 2009/0139781 A1 | 6/2009 | Straubel | |
| 2011/0204720 A1* | 8/2011 | Ruiz | B60L 11/1816 |
| | | | 307/66 |
| 2014/0309864 A1* | 10/2014 | Ricci | H04W 48/04 |
| | | | 701/36 |

FOREIGN PATENT DOCUMENTS

| | | |
|---|---|---|
| EP | 2803549 | 11/2014 |
| EP | 2879261 | 6/2015 |

* cited by examiner

*Primary Examiner* — Nga X Nguyen
(74) *Attorney, Agent, or Firm* — Honda Patents & Technologies North America, LLC; Mark E. Duell

(57) ABSTRACT

A system and method of managing the operation of a remotely controllable control unit for an appliance in a building during peak power demand hours with an application on a mobile device further in communication with a vehicle having a rechargeable battery capable of providing power to a power grid is disclosed. The application determines a state-of-charge of the rechargeable battery in the vehicle, and determines a location of the vehicle and whether the vehicle is within a threshold distance to the building. The building is preconditioned using the appliance to a preferred state if the vehicle is within the threshold distance to the building. When the vehicle arrives at the building, it is electrically connected to the power grid to provide electricity from the rechargeable battery to the power grid to replace the power used during the preconditioning.

14 Claims, 3 Drawing Sheets

SYSTEM AND METHOD FOR COOPERATIVELY OPERATING A SMART THERMOSTAT AND VEHICLE TO GRID AUTOMOBILE

BACKGROUND

A system for managing energy consumption is provided, particularly a control system which dynamically controls a household appliance, such as a home air conditioner, and generates a timing schedule to precondition a building with respect to time-related energy pricing, user need, travel habits, and offsets created by employing a vehicle to grid power system so as to efficiently manage the energy consumption and to minimize the user's electricity bill.

In supplying power to homes in certain jurisdictions, utility companies offer variable pricing plans where the price of electricity per unit will vary depending on peak time or power watch conditions, off peak conditions, and energy usage. Customers with advanced meters pay different amounts for electricity over these different conditions. Power prices are cheaper in the off peak times, and the peak time prices may vary wildly depending on conditions.

Power consumption in heating, ventilation and air conditioning (HVAC) systems has not been varied due to these time use periods. The operation of HVAC unit at peak time of utility price is not economical and may cost much more to the user. Some newer energy management system can simply perform the tasks of switching appliances on and off based on a preset schedule or if no user exists.

However, energy savings by known control units is not so great employing the conventional HVAC energy management system. To realize increased energy saving, it is necessary to actively collaborate in reducing energy consumption in peak hours and utilize off peak hours more efficiently.

Sometimes the user may be away from the place where the control unit is installed, resulting in uncontrolled electricity distribution. Thus the conventional approach fails to efficiently regulate the electricity consumption in HVAC systems since energy pricing is linked more directly to the supply and demand for power.

Vehicle-to-grid (V2G) describes a system in which plug-in electric vehicles, such as electric cars (BEVs) and plug-in hybrids (PHEVs), communicate with the power grid to sell demand response services by either delivering electricity into the grid or by throttling their charging rate.

Vehicle-to-grid can be used to provide excess grid capacity, particularly in peak hours. Since most vehicles are parked an average of 95% of the time, their batteries can be used to let electricity flow from the car to the power lines and back, with a value to the utilities of up to several thousand dollars per year per car.

Thus, it is desirable to provide an improved control system for managing the energy consumption in HVAC systems that overcome the disadvantages of the conventional power consumption control approaches. Also, it is desirable to take advantage of V2G opportunities to offset peak power charges related to energy consumption in an HVAC system.

Therefore, it is necessary to provide an improved system for HVAC system which enables the home to be preconditioned in a cost effective and desired manner. It is desirable to provide a system which dynamically switches on the electrical power supplied and generate a timing schedule to precondition the home with respect to the users conditioning needs, as well as by managing the energy consumption in peak times by providing a method of offsetting peak usage by peak V2G supply to minimize the user's electricity bill.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

One aspect is a method of managing the operation of a remotely controllable control unit for an appliance in a building with an application on a mobile device further in communication with a vehicle having a rechargeable battery capable of providing power to a power grid. The method includes the steps of determining a state-of-charge of the rechargeable battery in the vehicle, determining a location of the vehicle, determining whether the vehicle is within a threshold distance to the building, preconditioning the building using the appliance to a preferred state if the vehicle is within the threshold distance to the building, electrically connecting the vehicle to the power grid when the vehicle arrives at the building, and providing electricity from the rechargeable battery to the power grid.

Another aspect is a system of managing the operation of a remotely controllable control unit of an appliance in a building to use a fixed amount of electricity to precondition the building and returning the fixed amount of electricity used to precondition the building using a rechargeable battery in a vehicle capable of providing power to a power grid in a vehicle to grid system. The system includes an application residing on a mobile device, the mobile device capable of receiving signals to determine location of the mobile device and receiving a measurement of a state of charge on the rechargeable battery from the vehicle. The application determines whether the vehicle is within a threshold distance to the building. The application communicates through the mobile device with the remotely controllable control unit to turn on the appliance in the building if the vehicle is within the threshold distance to the home. The application communicates through the mobile device to turn off the remotely controllable control unit to turn off the appliance in the building once a fixed amount of electricity used by the appliance approximately equal to the state of charge on the rechargeable battery in the vehicle is used.

Yet another aspect is a method of managing the operation of a remotely controllable thermostat for an air conditioner in a home with an application on a mobile device further in communication with a vehicle having a rechargeable battery capable of providing power to a power grid. The method includes the steps of determining a state-of-charge of the rechargeable battery in the vehicle, determining a location of the vehicle, determining whether the vehicle is within a threshold distance to the home, preconditioning the home using the air conditioner to a preferred temperature if the vehicle is within the threshold distance to the home, electrically connecting the vehicle to the power grid when the vehicle arrives at the home, and providing electricity from the rechargeable battery to the power grid to replace an amount of electricity used by the air conditioner to precondition the home.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Programmable, self-learning, sensor-driven, Wi-Fi enabled thermostats, smoke detectors, and other security systems are well known products that allow a user to digitally set and manage energy consumed by household appliances, such as heating, ventilation, and air conditioning (HVAC) systems. Other home energy managers exist, for example, water heaters and furnaces.

Figure 1:
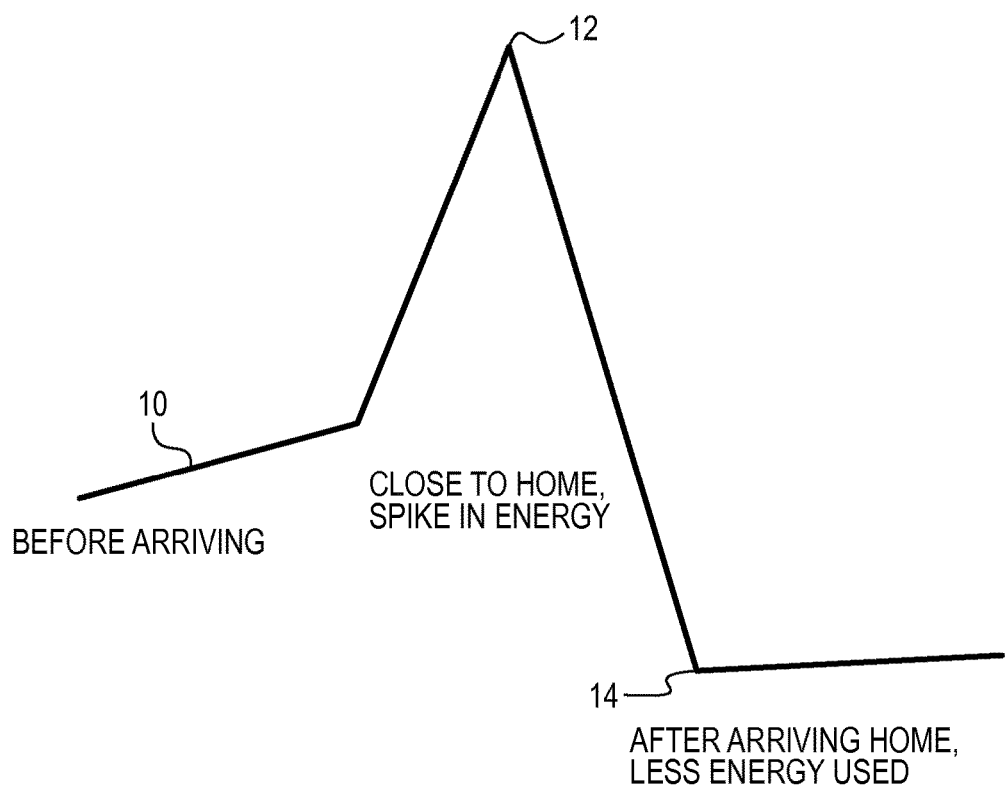
FIG. 1 is a graphical representation of energy usage.
Figure 2:
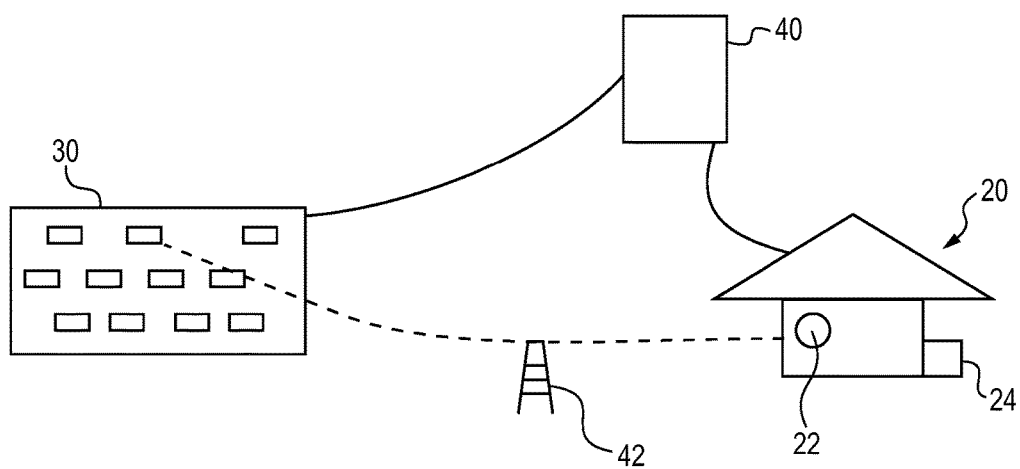
FIG. 2 is a schematic representation of an embodiment of the system.

FIG. 1 shows a graph of an embodiment providing a preconditioning strategy for a thermostat 22 of an HVAC system 24 of a home 20, further illustrated in FIG. 2. When a user is in a vehicle 30 away from home 20, at 10 on FIG. 1, home 20 energy usage may be low. Generally, during "rush hour," peak hours, or power watch conditions, energy usage, and thus, energy prices spike or rise. When this happens, smart thermostats, such as the NEST Learning Thermostat manufactured by Nest Labs. Inc., for example, may go into an intermittent operation mode, where the thermostat 22 or HVAC system 24 may reduce energy usage from the electrical power grid, not shown but known to those skilled in the art. As the vehicle 30 nears home 20, the thermostat 22 may precondition the home 20, thereby spiking energy usage, illustrated by the peak 12 in FIG. 1. Also known are vehicle to grid (V2G) power systems where plug-in electric vehicles 30, such as electric cars (BEVs) and plug-in hybrids (PHEVs), communicate with the power grid to sell demand response services by either delivering electricity into the grid or by throttling their charging rate. Power from an electric vehicle 30 may be used to supply electricity to appliances, such as the HVAC system 24 of the home 20. The embodiment described provides or adjusts a preconditioning strategy for the home HVAC system 24 based on proximity of the vehicle 30 from the HVAC system 24 or home 20 and an available state-of-charge (SOC) of the vehicle 30. For example, an in-vehicle app may track when a rush hour event or energy watch is in place, as well as a location of the vehicle 30 relative to home 20 or the HVAC system 24. When the vehicle 30 is plugged into a V2G system, home 20 energy drawn from the power grid drops dramatically, as shown as in the dip 14 in FIG. 1.

Figure 3:
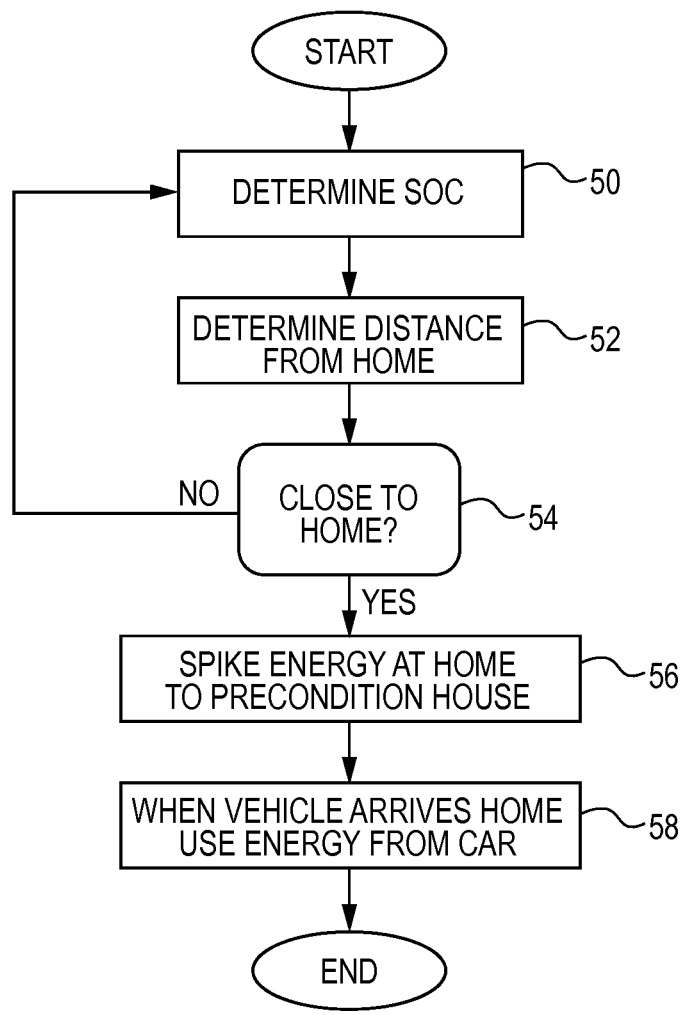
FIG. 3 is a flowchart of an embodiment of the method.

FIG. 3 shows a flowchart of an embodiment the system. If the vehicle 30 is a V2G vehicle, preconditioning may or may not occur first based on the SOC of the vehicle 30 (e.g., greater than a threshold amount of SOC) 50. Next, the system determines the location of the car, in a suitable fashion known to those skilled in the art 52. When a rush hour event or energy watch causes a spike in energy prices or a request for energy conservation to be implemented, and the vehicle 30 is within a predetermined time radius or distance radius 54 or on route to the home 20, different preconditioning may be implemented 56 for the HVAC system 24. If the vehicle 30 is not a V2G vehicle, a default intermittent HVAC setting 24 may be applied. Further, once the vehicle 30 arrives, intermittent HVAC 24 settings may not be required, as the HVAC system 24 may draw power or electricity from the electric vehicle 30 or battery thereof 58. Thus, the owner of the vehicle 30 may benefit from additional comfort as well as a reduced power bill.

The home 20 will benefit from having an energy saving period. The V2G vehicle gives energy back to the grid. However, before that the V2G vehicle 30 arrives, the home 20 may take energy with the anticipation that the energy will be given back when the V2G vehicle 30 arrives and is electrically connected to the grid. In this function, the V2G vehicle's 30 location would be communicated by any method known to one skilled in the art. In one embodiment, the V2G vehicle's 30 location may be communicated by using the vehicle's 30 embedded telephone. In another embodiment, the V2G vehicle's 30 location may be communicated through the telematics system within the vehicle 30 via a machine-to-machine communications network, such as the so-called Internet of Things (IoT) 40. In yet another embodiment, the location of the V2G vehicle 30 may be communicated by using the driver's mobile telephone attached to the vehicle 30 via a wired connection or any suitable wireless connection, such as Bluetooth, and to the home 20 via a cellular network 42. The distance would be used to determine when to precondition the home 20 by spiking the energy usage. This is known as load shifting.

Spiking is based on the SOC of the V2G vehicle 30. In additional embodiments, other factors to be considered include learning usage behaviors of the owner. For example, the system determines when the user comes home 20 and with what type of SOC the user typically arrives home 20. If there is a routine the user generally follows, the system can take this into account along with the distance to precondition the home 20. One factor that may used to determine preconditioning strategy is to factor the average time the user takes to drive home on a daily basis. By having access to this information, the system may pick a time after the user departs a specific location, and based on historical averages, select a proper time to begin preconditioning the home 20. In another embodiment, the system may select a preconditioning strategy based upon the temperature of the home 20. For example, if the non-conditioned temperature of the home 20 is lower than typical, the system can delay preconditioning to save energy until the user is nearer the home 20, measured either in distance or expected time to arrival. If the temperature of the home is at or near the preferred normal temperature, the system may elect to not do any preconditioning. Further, if the home 20 temperature is higher than normal, the system may elect to begin preconditioning sooner based on distance or expected time to arrival.

The system may also control other household systems through methods known to those skilled in the art. Other systems that may be controlled, for example, are the household fan system, shutters, and water heaters.

In another embodiment, the system may further use real-time traffic conditions to dynamically calculate expected time to arrival at a home 20, as well as expected SOC estimations, and adjusting the preconditioning strategy based on these dynamically calculated variables. For example, when a rush hour event exists, the estimated time to arrive at home 20 may be extended long enough that household preconditioning becomes unnecessary because arrival at home 20 may be delayed past the peak power period. A rush hour event may range from typical slow traffic caused by expected congestion of a road or freeway, road construction causing congestion due to road or lane closures, or traffic accidents causing congestion due to road or lane closures. The system uses real-time traffic, collected from any suitable source known to those skilled in the art, in addition to any known method for determining position, such as GPS, dead reckoning, or the like, to make a decision on whether to precondition the home 20.

In yet another embodiment, the system may learn to handle a scenario where the user is running errands and makes stops on the way home. If the user is known to be running errands, then the preconditioning strategy can be amended. The system can determine if the user is following a route that is not a typical route from work to home 20 stored in the system. The system may also detect the user is running errands if the vehicle makes unexpected stops and starts inconsistent with those consistent with the real-time traffic data. The user may also disable preconditioning on a mobile telephone application on a smart phone. As part of the learning, the system may also make determinations based on whether the vehicle is at an expected location, such as work. For example, if the starting location is at work, then the user most likely would be going home. Further, if the user is at another store, they may be running a number of errands.

The preconditioning system may also be adjusted or disabled if the rechargeable batteries in the V2G vehicle have a low SOC. The preconditioning may be lessened or less aggressive if the SOC is low given that the V2G vehicle may not be able to provide much electricity to the grid. Thus, load shifting may still be implemented, but preconditioning can be delayed. A User Interface (UI) on the mobile phone application can be made to prompt the user for additional feedback, such as whether or not to precondition the home 20.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method of managing the operation of a remotely controllable control unit for an appliance in a building with an application on a mobile device further in communication with a vehicle having a rechargeable battery capable of providing power to a power grid, comprising the steps of:
   determining a state-of-charge of the rechargeable battery in the vehicle;
   determining a location of the vehicle;
   determining whether the vehicle is within a threshold distance to the building;
   preconditioning the building using the appliance to a preferred state if the vehicle is within the threshold distance to the building;
   electrically connecting the vehicle to the power grid when the vehicle arrives at the building; and
   providing electricity from the rechargeable battery to the power grid.

2. The method of claim 1 wherein the appliance is an air conditioner and the preferred state is a preferred temperature.

3. The method of claim 2 wherein the step of preconditioning the building further comprises the step of:
   measuring a temperature in the building;
   starting the air conditioner in the building;
   stopping the air conditioner in the building when the temperature in the building is equal to the preferred temperature.

4. The method of claim 3 wherein the air conditioner is stopped prior to reaching the preferred temperature if the state-of-charge of the rechargeable battery is below a threshold level.

5. The method of claim 3 wherein the threshold level is a level of the state-of-charge equal to a level of electricity necessary to precondition the building.

6. The method of claim 3 wherein the air conditioner is not started if the temperature of the building is equal to or less than the preferred temperature of the building.

7. The method of claim 1 wherein the step of determining whether the vehicle is within a threshold distance to the building further comprises the steps of:
   estimating a time to arrive at the building based on a calculated distance between a current location of the vehicle and the building based upon historical driving patterns of an user;
   adjusting the time to arrive at the building further based on real-time traffic information; and
   calculating the threshold distance to be a distance traversable in a calculated time to arrive at the building required to precondition the building.

8. The method of claim 1 wherein the mobile device is a telephone.

9. The method of claim 1 wherein the step of determining a location of the vehicle further comprises the step of:
   calculating location based upon signals received from a global positioning satellite system.

10. The method of claim 1 wherein the step of determining a location of the vehicle further comprises the step of:
    calculating location based upon signals received from a cellular telephone network.

11. A method of managing the operation of a remotely controllable thermostat for an air conditioner in a home with an application on a mobile device further in communication with a vehicle having a rechargeable battery capable of providing power to a power grid, comprising the steps of:
    determining a state-of-charge of the rechargeable battery in the vehicle;
    determining a location of the vehicle;
    determining whether the vehicle is within a threshold distance to the home;
    preconditioning the home using the air conditioner to a preferred temperature if the vehicle is within the threshold distance to the home;
    electrically connecting the vehicle to the power grid when the vehicle arrives at the home; and
    providing electricity from the rechargeable battery to the power grid to replace an amount of electricity used by the air conditioner to precondition the home.

12. The method of claim 11 wherein the step of preconditioning the home further comprises the step of:
    measuring the temperature in the home;
    starting the air conditioner in the home;
    stopping the air conditioner in the home when the temperature in the home is equal to the preferred home temperature.

13. The method of claim 12 wherein the air conditioner is stopped prior to reaching the preferred temperature if the state of charge of the rechargeable battery is below a threshold level equal to a level of electricity necessary to precondition the home.

14. The method of claim 12 wherein the air conditioner is not started if the temperature of the home is equal to or less than the preferred temperature of the home.

* * * * *